United States Patent [19]

Primosch et al.

[11] 3,921,220

[45] Nov. 18, 1975

[54] APPARATUS FOR AUTOMATIC HIGH SPEED POSITIONING OF MAGNETIC RECORDING TAPE BY SENSING REEL REVOLUTIONS FROM TAPE BEGINNING

[75] Inventors: Herbert F. Primosch, Tustin; Allen E. Fisher, West Covina, both of Calif.

[73] Assignee: Odetics, Inc., Anaheim, Calif.

[22] Filed: July 15, 1974

[21] Appl. No.: 488,309

[52] U.S. Cl. .................................... 360/72; 242/191
[51] Int. Cl. ...................... G11b 15/18; B65m 59/38
[58] Field of Search ......................... 360/72; 242/191

[56] References Cited

UNITED STATES PATENTS

| | | | |
|---|---|---|---|
| 3,541,271 | 11/1970 | Joslow et al. | 360/72 |
| 3,714,382 | 1/1973 | Sykes | 360/72 |
| 3,812,532 | 5/1974 | Crosser et al. | 360/72 |

*Primary Examiner*—Bernard Konick
*Assistant Examiner*—R. S. Tupper
*Attorney, Agent, or Firm*—Philip M. Hinderstein

[57] ABSTRACT

A remote control, electronic, random access, automatic apparatus for use with a standard tape player for locating and playing a prerecorded message on a tape. Numerical pushbuttons permit selection of any prerecorded message on the tape and the tape player automatically locates the program and initiates the beginning of the message. The actual tape position is sensed by either counting rotations of one of the tape reels or by comparing the rotation of the tape reel with the rotation of the tape drive mechanism. In the latter case, the tape position sensor provides a beginning-of-tape and an end-of-tape signal.

21 Claims, 6 Drawing Figures

APPARATUS FOR AUTOMATIC HIGH SPEED POSITIONING OF MAGNETIC RECORDING TAPE BY SENSING REEL REVOLUTIONS FROM TAPE BEGINNING

BACKGROUND OF THE INVENTION

1. Field of the Invention

The present invention relates to an automatic program locator and, more particularly, to apparatus controlling a conventional tape player for retrieving and playing prerecorded information and for determining actual tape position.

2. Description of the Prior Art

The development of standard types of cassettes for storing audio and video magnetic tape has greatly expanded the use of magnetic tape for prerecording messages. Prerecorded cassette tapes are now widely used as teaching, training, and sales aids.

In the most common situation, a particular message, classroom lecture, sales program, training aid, or the like, is prerecorded on a cassette tape and the user listens to or watches the tape from the beginning thereof so that there is no particular problem associated with the searching for a particular tape segment. However, it is often the case that the capacity of the tape cassette is much greater than the length of any one message and it is inefficient to limit each tape cassette to one message. Thus, in order to increase the versatility of audio and video playback as a teaching, training, and sales technique, it becomes desirable to prerecord a number of separate and distinct programs on a single cassette tape. For example, short segments of a continuous tape program can be used to illustrate a classroom lecture or a number of separate product messages can be recorded on a single cassette for use as a point of purchase or product demonstration sales tool.

The problem therefore becomes one of locating the desired program when a number of programs are prerecorded on a length of recording tape. In the past, it has become necessary to search for the program using a trial and error "look-and-see" searching technique. However, such a random back and forth searching technique has a number of disadvantages. In the first instance, a trial and error searching technique is frustrating and the unwanted images are distracting to the viewer. When used as a sales technique for visually demonstrating a product, the attention of customers is often lost due to fumbling with the equipment. The trial and error searching technique is time consuming and the repeated start and stop cycles subject the tape to excessive wear and tear.

In order to solve this problem, various techniques for coding the location of prerecorded messages on tapes have been proposed. Previous methods have prerecorded location identifiers on the tape whereby the tape player may search for the location identifier. However, where location identifiers are stored directly on the tape medium, the programing of the tape is necessarily complicated by the necessity of recording the location identifiers during the programing process. This approach also complicates the procedure for adding additional tape locations which a particular user may find convenient for subsequent use.

SUMMARY OF THE INVENTION

According to the present invention, these problems are solved in a manner unknown heretofore. The present application discloses a novel automatic, remote control, electronic, random access apparatus for locating a prerecorded message on a tape and for automatically initiating the playing of such message.. According to the present invention, numerical pushbuttons allow a user to select any segment or portion of a cassette tape. Within seconds, and without touching the cassette player or receiver, the desired message begins. One can switch from one tape segment to another in any random sequence or a single segment can be repeated again and again.

The present automatic program locator eliminates time consuming "look-and-see" searching. The tape player automatically advances or rewinds at fast speed and then starts the program at the exact position selected. By advancing directly to each new segment before threading, the present apparatus eliminates most of the wear and tear that occurs with repeated start and stop cycles. The present locator reduces tape and duplicating costs by allowing a number of programs to be combined on a single cassette. Furthermore, by eliminating all back and forth searching, one avoids frustration and the distraction of unwanted messages.

The present invention also eliminates the necessity of recording location identifiers on the tape. The present apparatus creates its own identifier by counting rotations of the supply or take-up reel and the rotation count becomes the locator number. This makes programing particularly simple and also simplifies the procedure for adding additional tape locations that a user may find convenient for subsequent use. The present system is then adaptable to any tape player or recorder using a tape medium.

According to the present invention, the actual tape position may be determined by metering the ratio of the circular area of the tape drive capstan to the circumference of the outermost wrap of tape on one of the tape reels. Since the rotations per unit time of the drive capstan are constant while the rotations per unit time of the reel change from a slow rate, when full, to an increasing rate as the reel is emptied, such a method is inherently highly accurate.

Briefly, the present apparatus for automatically locating and playing a prerecorded message on a tape comprises manual means for selecting a first number which corresponds to the location of the prerecorded message on the tape, the first number being indicative of the desired number of revolutions of one of the tape reels from the beginning of the tape; means for storing the first number; means operatively coupled to the tape player and including means for sensing the rotation of the one tape reel for generating a second number indicative of the actual number of revolutions of the one tape reel from the beginning of the tape; means for comparing the first and second numbers; and means operatively coupled to the comparing means and responsive to the absence of coincidence between the first and second numbers for signaling the tape player to advance or rewind at a high speed in a direction to decrease the difference between the first and second numbers, the signaling means being responsive to coincidence between the first and second numbers for signaling the tape player to automatically play the tape at low speed.

According to one embodiment of the invention, the actual tape position is determined by automatically rewinding the tape to the beginning thereof and by counting reel rotations as one of the tape reels winds or unwinds the tape. According to a second embodiment of the invention, rotation of one of the tape reels and rotation of the tape drive capstan are sensed and a determination is made as to the ratio of the capstan speed to the reel speed. At the beginning of the forward direction of operation, the rotation rate of the supply reel, for example, is low and continually increases as the tape moves from the supply reel to the take-up reel. In the reverse direction, the opposite condition occurs. Thus, by comparing successive ratios to pre-programmed information, the exact tape position may be continuously determined.

OBJECTS

It is therefore an object of the present invention to provide an automatic program locator.

It is a further object of the present invention to provide apparatus controlling a conventional tape player for retrieving and playing prerecorded information.

It is a still further object of the present invention to provide apparatus for determining the position of a length of tape in a tape player.

It is another object of the present invention to provide an automatic program locator which eliminates time consuming "look-and-see" searching.

It is still another object of the present invention to provide an automatic program locator which eliminates tape wear and tear and reduces tape and duplicating costs.

Another object of the present invention is the provision of an automatic program locator which eliminates the necessity of prerecording location identifiers on tape.

Still another object of the present invention is the provision of a beginning-of-tape/end-of-tape sensor that determines actual tape position by measuring the circumference of the outermost wrap of tape on one of the reels in a tape system.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

Figure 1:
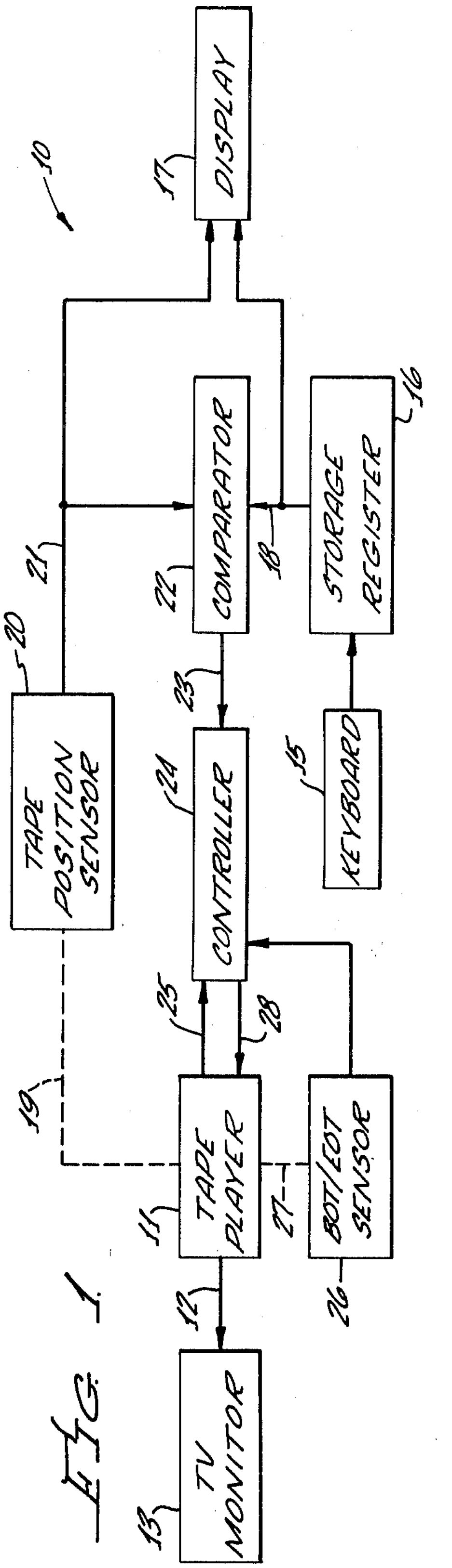
FIG. 1 is a block diagram of an automatic program locator constructed in accordance with the teachings of the present invention.

Referring now to the drawings and, more particularly, to FIG. 1 thereof, there is shown a block diagram of the present automatic program locator, generally designated 10. Program locator 10 is designed for use with a conventional cassette tape player 11 which may either be an audio tape player or which preferably is a video cassette player. In the latter case, the output of tape player 11 is conducted via a line 12 to a conventional TV monitor 13 for viewing the output of tape player 11. In either event, tape player 11 includes a tape drive mechanism including a tape drive capstan for contacting the magnetic tape and for transporting the tape from a supply reel to a take-up reel, as will be explained more fully hereinafter.

Program locator 10 includes manual means 15 for selecting a first number which corresponds to the location of a desired prerecorded message on the tape in tape player 11. Means 15 may simply be a manual keyboard made up of a series of single pole, single throw switches, including at least the digits zero through nine, which control a conventional diode, binary-coded-decimal matrix. The number entered into keyboard 15 is transferred to a conventional storage register 16 which stores the number until a new number is entered by keyboard 15. The output of storage register 16, on a line 18, may be visually displayed by display means 17, for reasons which will appear more fully hereinafter.

Program locator 10 also includes means 20 operatively coupled to tape player 11, by a mechanical connection 19, for generating, on a line 21, a second number indicative of the actual position of the tape in tape player 11. This second number is also applied to display 17 where it is visually displayed simultaneously with the first number stored in storage register 16.

In accordance with the present invention, and as will be explained more fully hereinafter, both the first and second numbers are indicative of the number of revolutions of either the supply reel or the take-up reel in player 11, such as the supply reel, from the beginning of the tape. By simply sensing rotation of the supply reel, program locator 10 creates its own identifier without storing location identifiers on the tape. This makes programing particularly simple and also simplifies the procedure for adding additional tape locations that a user may find convenient for subsequent use.

In any event, the first and second numbers on lines 18 and 21, respectively, are applied to means, generally designated 22, for comparing the first and second numbers and for generating, on a line 23, a signal indicative of the results of such comparison. The output of comparator 22, on line 23, is applied to means, generally designated 24, for interpreting the output of comparator 22 and for signalling tape player 11, via a line 28, to either advance or rewind at high speed or to play the tape at low speed. More specifically, if comparator 22 determines that the second number is higher than the first number, controller 24 signals tape player 11 to rewind the tape. Conversely, if comparator 22 determines that the second number is lower than the first number, controller 24 signals tape player 11 to rapidly wind the tape. Finally, when comparator 22 senses coincidence between the first and second numbers, controller 24 signals tape player 11 to automatically play the tape at low speed.

Controller 24 requires certain other signals about the status of tape player 11 in order to provide an effective search/play sequence. For example, controller 24 receives directly from tape player 11, over a line 25, a signal that the tape cassette has been inserted. Furthermore, controller 24 requires a signal indicating both the beginning of the tape (BOT) and the end of the tape (EOT) and this is derived from a sensor 26 which is mechanically coupled to tape player 11, as shown at 27. For present purposes, sensor 26 may be any known device for sensing when the tape is fully rewound and fully unwound. An end-of-tape signal is required by controller 24 to turn tape player 11 off at the end of the tape. Furthermore, in one embodiment of program locator 10, where tape player 11 automatically rewinds the tape when the cassette is placed therein, a beginning-of-tape signal is required by controller 24 to signal tape player 11 that the beginning of the tape has been reached. A beginning-of-tape signal is also required to reset certain circuit elements to be described more fully hereinafter.

Figure 3:
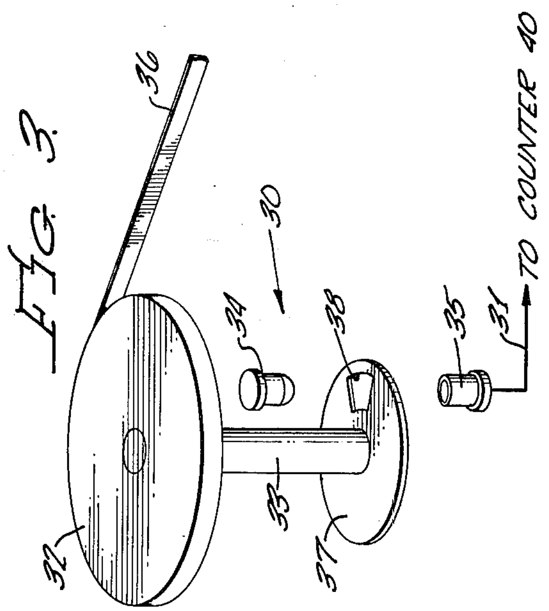
FIG. 3 is a simplified diagrammatic view of a preferred embodiment of reel rotation sensor for use in the sensor of FIG. 2.
Figure 2:
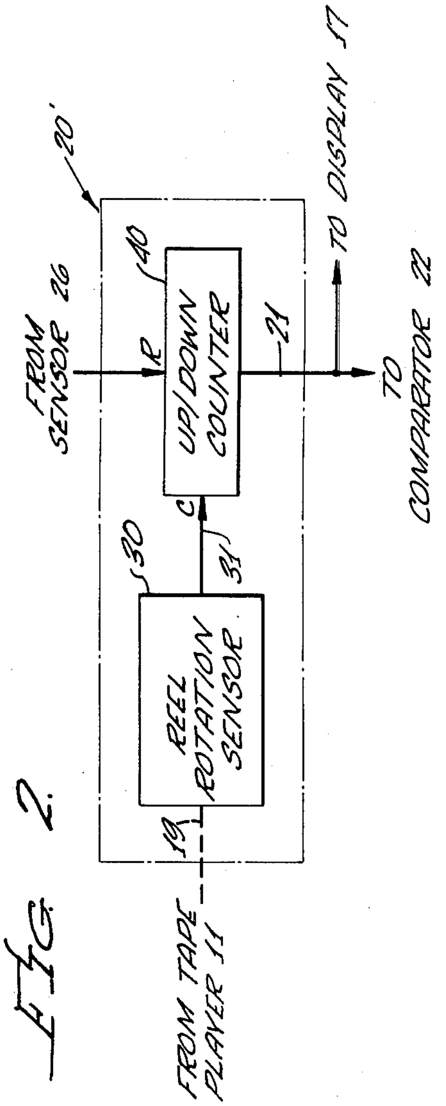
FIG. 2 is a block diagram of a first embodiment of tape position sensor for use in the locator of FIG. 1.

Referring now also to FIGS. 2 and 3, there is shown a first embodiment of tape position sensor 20, generally designated 20'. According to the embodiment of FIGS. 2 and 3, program locator 10 determines the actual position of tape 36 by counting the revolutions of one of the tape reels from the beginning of the tape. Thus, tape position sensor 20' includes a reel rotation sensor 30 for producing at least one pulse on a line 31 for each rotation of one of the tape reels. As shown in FIG. 3, one of the tape reels 32, such as the supply reel, is mounted for rotation on a shaft 33. Reel rotation sensor 30 includes energy transmitting means 34 and energy receiving means 35. For example, energy transmitting means 34 may be a source of infrared energy and energy receiving means 35 may be an infrared sensor for producing a first characteristic output when infrared energy is received and a second characteristic output when no energy is received.

Reel rotation sensor 30 further includes a shutter 37 operatively coupled to tape reel 32 such as by being mounted on shaft 33 so as to be rotatively driven therewith. Shutter 37 is interposed between energy transmitting means 34 and energy receiving means 35 so as to normally block the passage of energy therebetween. On the other hand, shutter 37 has at least one aperture 38 therein which permits energy receiving means 35 to receive energy from transmitting means 34 once for each rotation of supply reel 32. While shutter 37 may have any desired number of apertures 38 therein, it preferably has but a single aperture 38 so that energy receiver 35 produces, on line 31, a single output pulse for each rotation of shutter 37 and reel 32.

Referring back to FIG. 2, tape position sensor 20' also includes counting means 40 having the capability of increasing and decreasing the count stored therein and having a count input (C) and a reset input (R). The output signal from energy receiving means 35, on line 31, is applied to the count input of counter 40. Assuming counter 40 has been reset when tape 36 is completely rewound on reel 32, counter 40 will increment one count for each forward rotation of reel 32 and will decrement one count for each backward rotation of reel 32. Thus, counter 40 is capable of generating, at the output thereof, on line 21, a count which is indicative of the number of revolutions of tape reel 32 from the beginning of the tape. Such output on line 21 is applied both to display 17 and to comparator 22.

Should a cassette that is not rewound be inserted into tape player 11, counter 40 obviously cannot give a correct indication of the actual tape position. In this case, controller 24 may readily be programed to signal tape player 11 to rewind at high speed to the beginning of the tape. Upon reaching the beginning of the tape, sensor 26 generates a beginning-of-tape signal which may be applied to the reset input of up-down counter 40 to reset the count therein to zero. Furthermore, at this time, if a desired program has been inserted into keyboard 15, comparator 22 would sense an absence of coincidence between the first and second numbers on lines 18 and 21, respectively, causing controller 24 to signal tape player 11 to advance at high speed in a direction to decrease the difference between the first and second numbers until coincidence is reached. At this time, tape player 11 proceeds as described previously.

Figures 4, 5:
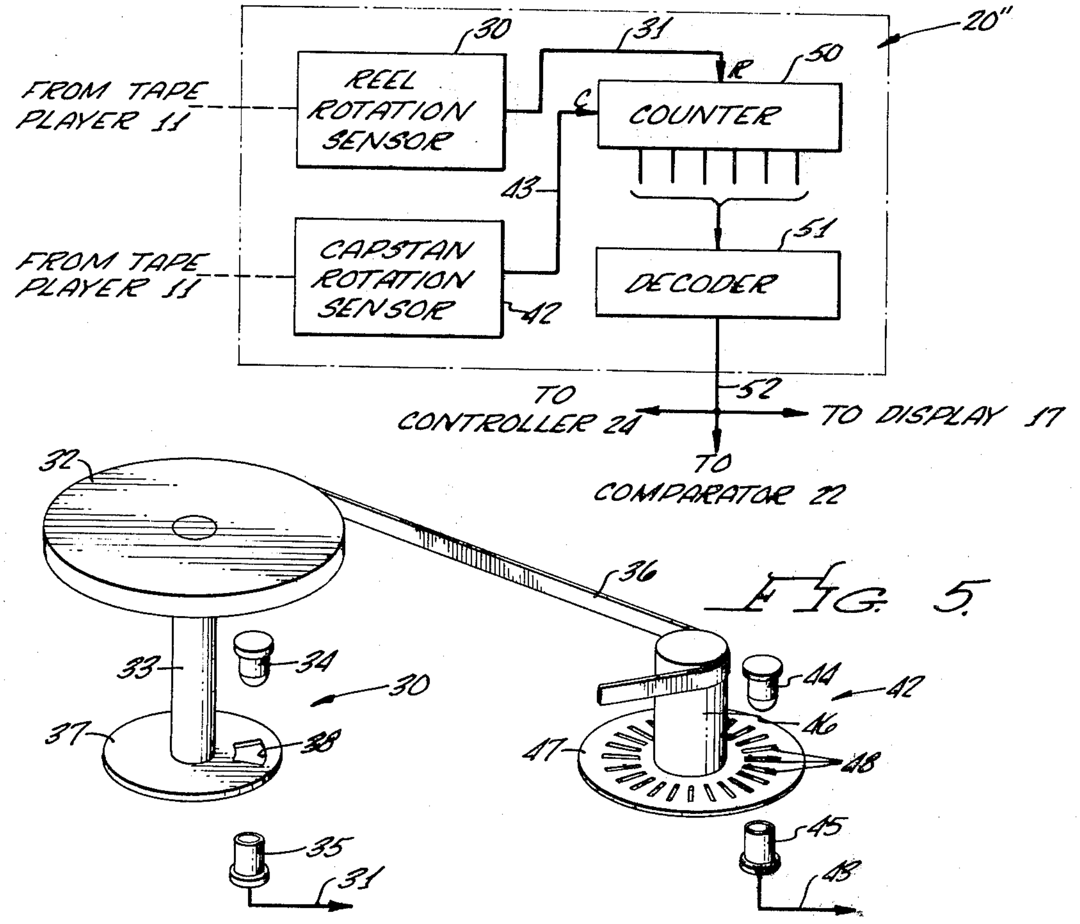
FIG. 4 is a block diagram of a second embodiment of tape position sensor for use in the locator of FIG. 1.
FIG. 5 is a simplified diagrammatic view of a reel rotation sensor and a tape drive capstan rotation sensor for use in the sensors of FIG. 4.

Referring now to FIGS. 4 and 5, there is shown a second embodiment of tape position sensor 20, generally designated 20''. Tape position sensor 20'' includes a reel rotation sensor 30 which is identical to the one in tape position sensor 20' for generating a first output pulse on line 31 for each rotation of tape reel 32. Thus, as shown in FIG. 5, reel rotation sensor 30 includes energy transmitting and receiving means 34 and 35, respectively, and shutter means 37, having a single aperture 38, mounted on the same shaft 33 with reel 32. On the other hand, tape position sensor 20'' also includes means 42 for sensing the rotation of the tape drive mechanism and for generating, on a line 43, at least one second output pulse for each rotation thereof. As shown in FIG. 5, a conventional tape player 11 includes a capstan shaft 46 which is driven at a constant speed by a suitable motor, not shown, for conducting tape 36 past the record or playback heads at constant speed. According to the present invention, mounted on capstan 46 is a second shutter 47, shutter 47 having a plurality of apertures 48 therein, for reasons which will appear more fully hereinafter. Shutter 47 is interposed between a second energy transmitting means 44 and a second energy receiving means 45 so that, as explained previously, energy receiving means 45 produces an output pulse on line 43 every time one of apertures 48 passes between transmitting means 44 and receiving means 45.

Tape position sensor 20'' determines the position of tape 36 by measuring the circumference of the outermost wrap of tape 36 on supply reel 32. This is done by determining the ratio of the speed of capstan 46 to the speed of shaft 33. Physically, this is done by counting how many pulses appear on line 43 in exactly one revolution of reel 32, as indicated by the time between pulses on line 31.

The rotations per unit time of capstan 46 are constant while the rotations per unit time of reel 32 change from a slow rate, when reel 32 is full, to an increasing rate as reel 32 is emptied. Furthermore, the number of pulses on line 43 compared to the number of pulses on line 31 is independent of the tape speed since the tape speed cancels in the ratio process.

Referring back to FIG. 4, the output of reel rotation sensor 30, on line 31, is applied to the reset input (R) of a counter 50. The output of capstan rotation sensor 42, on line 43, is applied to the count input (C) of counter 50. Since reel rotation sensor 30 resets counter 50 once for each revolution of reel 32, the count in counter 50 prior to being reset is indicative of the rotation of capstan 46 for one reel revolution. It can now be appreciated why shutter 47 preferably has a large number of apertures 48 therein since the potential accuracy of tape position sensor 20'' is a function of the degree of accuracy with which counter 50 can sense the amount of rotation of capstan 46 for one rotation of reel 32.

The output of counter 50 is applied to a decoder 51 which may simply be a pre-programed memory for converting the count output of counter 50 to a number indicative of the position of tape 36. Preferably, decoder 51 generates a number indicative of the revolutions of tape reel 32 from the beginning of tape 36. Since there is a limited number of different possible outputs of counter 50 depending upon the length of tape 36, the number of apertures 48 in shutter 47, etc., decoder 51 may simply be a conventional read-only memory which selects a given numerical output depending upon the count in counter 50. This output of decoder 51, on a line 52, is identical to the output of up-down counter 40, on line 21, in tape position sensor 20', and may be applied to comparator 22 and display 17.

One of the advantages of tape position sensor 20'' over tape position sensor 20' is that tape position sensor 20'' is capable of indicating the position of tape 36 independently of whether reel 32 has initially been rewound or not. Thus, if a tape cassette which has not been rewound is inserted into tape player 11, tape position sensor 20'' is immediately operative to determine the number of revolutions of reel 32 from the beginning thereof without first rewinding reel 32. Thus, the output of decoder 51 is also capable of providing a beginning-of-tape and an end-of-tape signal on line 52 for application to controller 24, eliminating the necessity for a separator sensor 26.

Figure 6:
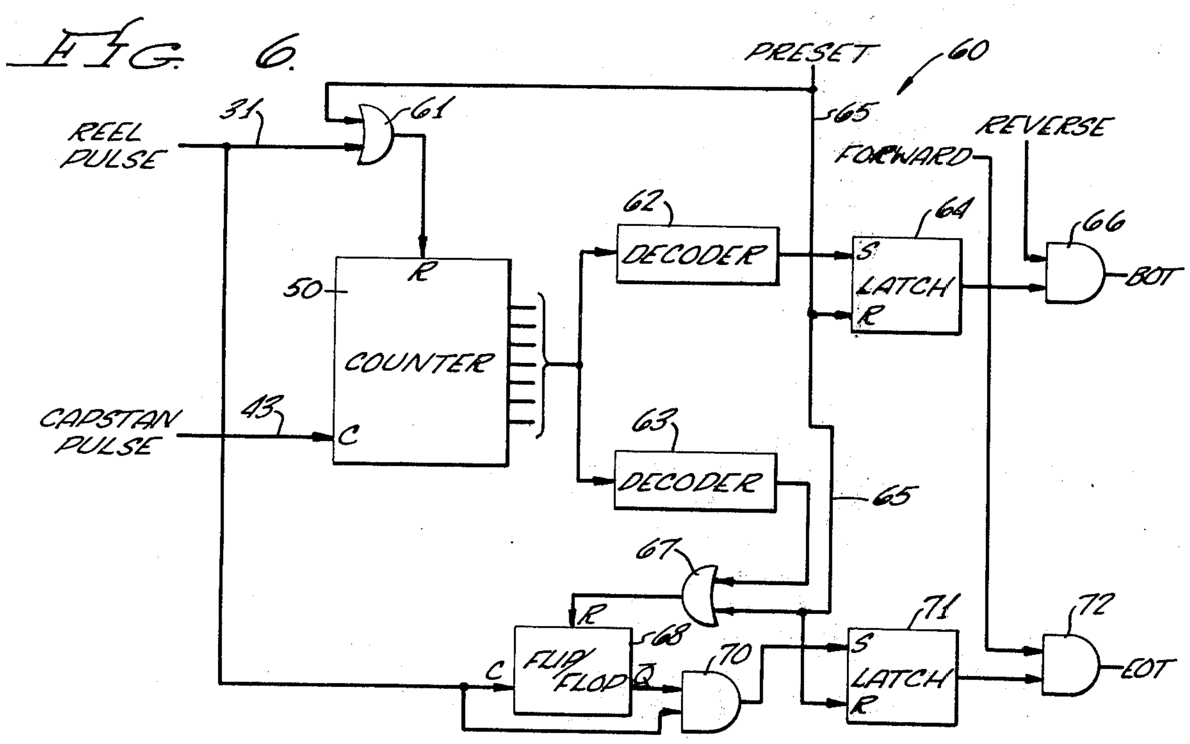
FIG. 6 is a more detailed block diagram of an end-of-tape/beginning-of-tape sensor for use in the locator of FIG. 1.

Referring now to FIG. 6, there is shown apparatus, generally designated 60, for generating a beginning-of-tape signal and an end-of-tape signal from the output of counter 50 in tape position sensor 20''. More specifically, the pulses on line 31 from reel rotation sensor 30 are applied via the first input of an OR gate 61 to the reset input (R) of counter 50 whereas the pulses on line 43 from capstan rotation sensor 42 are applied to the count input (C) of counter 50. The output of counter 50 is applied simultaneously to first and second decoders 62 and 63, both of which have pre-programed numbers stored therein. The output of decoder 62 is applied to the set input (S) of a first latch circuit 64 which receives, at its reset input (R), a preset signal on a line 65. This preset signal on line 65 is also applied to the second input of OR gate 61. The output of latch circuit 64 is applied to the first input of an AND gate 66 which receives, at its second input, a signal from tape player 11 indicative of the fact that tape player 11 is operating in the reverse mode. The output of gate 66 provides a beginning-of-tape (BOT) signal.

The output of decoder 63 is applied to the first input of an OR gate 67 which receives, at its second input, the preset signal on line 65. The output of gate 67 is applied to the reset input (R) of a flip/flop circuit 68. The reel pulses on line 31 from reel rotation sensor 30 are applied to the clock input (C) of flip/flop 68 and also to the first input of an AND gate 70. Whenever flip/flop 68 is clocked to its set condition, it generates an output at its complementary output ($\overline{Q}$), which output is applied to the second input of AND gate 70. The output of AND gate 70 is applied to the set input (S) of a second latch 71 which receives, at its reset input (R), the preset signal on line 65. The output of latch circuit 71 is applied to the first input of AND gate 72 which receives, at its second input, a signal from tape player 11 indicative of the fact that tape player 11 is operating in the forward mode. The output of AND gate 72 provides an end-of-tape (EOT) signal.

In operation, the initial conditions are established by a preset command on line 65 which resets counter 50, flip/flop 68 and latch circuits 64 and 71. When tape player 11 is operating in the reverse mode, rewinding tape reel 32, AND gate 66 is enabled and AND gate 72 is disabled. As explained previously, counter 50 is clocked by the pulses appearing on line 43 indicative of the rotation of capstan shaft 46 and is reset once per revolution of tape reel 32. At the beginning of the reverse mode, the rate of reset of counter 50 is very rapid since reel 32 is empty and rotating at high speed. As reel 32 gradually fills with tape 36, shaft 33 rotates at a lower speed and the time spacing between reset pulses increases. Since the rate of capstan pulses on line 43 remains essentially constant, counter 50 continues to generate a higher and higher count. Decoder 62 has a pre-programed count therein indicative of the highest number of pulses which will be generated on line 43 between consecutive pulses on line 31. This condition occurs when tape reel 32 is full, indicating that tape 36 has been completely rewound.

At the beginning of the reverse mode, the rate of reset of counter 50 is such that the count developed by counter 50 is not enough for decoder 62 to develop an output. However, as the rate of pulses on line 31 decreases, a larger and larger count is developed by counter 50 before being reset by each reel pulse. Finally, a sufficiently large count (as determined by the configuration of decoder 62) is reached. Decoder 62 applies a signal to the set input of latch circuit 64 which now applies an output to gate 66. Since gate 66 has been enabled by the reverse command, the beginning-of-tape signal is developed which can be used to stop tape 36 for the reverse direction.

The operation in the forward direction is similar. Initial conditions are again established by the preset command on line 65. In the forward direction, gate 72 is enabled and gate 66 is disabled. Decoder 63 is similar to decoder 62 but is pre-programed to detect a much smaller count than decoder 62 was programed for. In fact, decoder 63 is looking for a minimum number of counted capstan pulses on line 43 for each rotation of reel 32. In other words, at the beginning of the forward direction, with tape 36 rewound on reel 32, reel 32 is rotating slowly and the rate of pulses on line 31 is relatively low permitting counter 50 to reach a relatively high count before being reset. Since the pre-programed number stored in decoder 63 is relatively low, decoder 63 will always develop an output before the next reel pulse occurs on line 31.

In the forward mode of operation, apparatus 60 is looking for the occurrence of two consecutive pulses on line 31 before a count being developed in counter 50 which produces an output from decoder 63. Thus, when a pulse arrives on line 31, it clocks flip/flop 68, which enables gate 70. However, before the next reel pulse arrives on line 31, counter 50 counts a sufficient number of capstan pulses on line 43 to activate decoder 63 which resets flip/flop 68 via OR gate 67, disabling gate 70. Therefore, when the next reel pulse arrives on line 31, it is inhibited by gate 70. This process continues until reel 32 is so empty that the rate of pulses on line 31 increases such that a second pulse arrives on line 31 before the count in counter 50 has reset flip/flop 68 via decoder 63 and OR gate 67. Under these circumstances, the second pulse on line 31 passes through gate 70 and sets latch circuit 71. Since gate 72 is now enabled, the output of latch circuit 71 passes through gate 72 producing an end-of-tape signal which can be used to stop tape 36 or reverse the direction thereof.

The system of FIG. 6 for sensing the beginning and the end of tape 36 has the advantage that only a single reel rotation sensor 30 is required for both forward and reverse operation. However, in practise, the use of a single reel rotation sensor may be undesirable due to the inherent inaccuracies of such a system when measuring a full reel of tape. In other words, when a reel is full, its speed of rotation is effected by the thickness of tape 36 and how tightly the tape has been wound on reel 32. These two factors make the beginning of tape signal vulnerable to inaccuracies. To solve this problem, both the take-up reel and the supply reel may be provided with reel rotation sensors 30 and only the forward mode components described in FIG. 6 would be required. In this case, the forward and reverse signals may be used to select which reel rotation sensor has its output applied to counter 50.

While this invention has been described with respect to the preferred physical embodiments constructed in accordance therewith, it will be apparent to those skilled in the art that various modifications and improvements may be made without departing from the scope and spirit of the invention. It will also be apparent to those skilled in the art that the discussion of many of the components of program locator 10 has been somewhat simplified for ease of understanding and that modifications within the capabilities of those skilled in the art may be made. For example, while reel rotation sensor 30 has been disclosed as including a single shutter 37 and a single energy receiving means 35, it will be apparent to those skilled in the art that a more complex arrangement of multiple shutters and receivers may be used in order to distinguish the direction of rotation of shaft 33. Accordingly, it is to be understood that the invention is not to be limited by the specific illustrative embodiments, but only by the scope of the appended claims.

We claim:

1. Apparatus for use with a standard tape player of the type including a tape drive mechanism for transporting magnetic tape from a supply reel to a take-up reel, for automatically locating a prerecorded message on said tape comprising:

manual means for selecting a first number which corresponds to the location of said prerecorded message on said tape, said first number being indicative of the desired number of revolutions of one of said tape reels from the beginning of said tape;

means for storing said first number;

means operatively coupled to said tape player and including means for sensing the rotation of said one tape reel for generating a second number indicative of the actual number of revolutions of said one tape reel from said beginning of said tape;

means for comparing said first and second numbers; and means operatively coupled to said comparing means and responsive to the absence of coincidence between said first and second numbers for signaling said tape player to advance or rewind, at a high speed, in a direction to decrease the difference between said first and second numbers, said signaling means being responsive to coincidence between said first and second numbers for signaling said tape player to automatically play said tape at low speed.

2. Apparatus according to claim 1 wherein said first number selecting means comprises:

a manual keyboard including the digits 0 through 9.

3. Apparatus according to claim 1 wherein said means for sensing the rotation of said one tape reel produces an output signal for each rotation of said one tape reel and wherein said second number generating means comprises:

counting means having the capability of increasing and decreasing the count scored therein and having a count input and a reset input, said output signal from said one tape reel rotation sensing means being applied to said count input of said counting means, the output of said counting means, being indicative of the number of revolutions of said one tape reel from said beginning of said tape, being applied to said comparing means.

4. Apparatus according to claim 3 further comprising:

means operatively coupled to said tape player for sensing the beginning of said tape and for generating a signal indicative thereof, said beginning of tape signal being applied to said reset input of said counting means to reset said counting means to a zero count at the beginning of said tape.

5. Apparatus according to claim 4 wherein said signaling means is further operative, upon insertion of said tape into said tape player, to signal said tape player to rewind, at high speed, to the beginning of said tape and, upon reaching the beginning of said tape, to signal said tape player to advance, at high speed, in a direction to decrease the difference between said first and second numbers until coincidence is reached.

6. Apparatus according to claim 3 further comprising:

means for simultaneously displaying said first number stored in said storing means and said second number at the output of said counting means.

7. Apparatus according to claim 1 wherein said second number generating means further includes:

means operatively coupled to said tape drive mechanism for sensing the rotation thereof; and means responsive to said one tape reel rotation sensing means and said tape drive mechanism rotation sensing means for ratioing the outputs thereof to derive said second number.

8. Apparatus according to claim 7 wherein said means for sensing the rotation of said one tape reel produces at least one first signal for each rotation of said one tape reel, wherein said means for sensing the rotation of said tape drive mechanism produces at least one second signal for each rotation of said tape drive mechanism, and wherein said ratioing means comprises:

counting means having a count input and a reset input, said first signals being applied to said reset input of said counting means and said second signals being applied to said count input of said counting means, the output of said counting means being indicative of the amount of rotation of said tape drive mechanism for a given rotation of said one tape reel; and decoding means coupled to the output of said counting means for generating said second number indicative of the number of revolutions of said one tape reel from said beginning of said tape, the output of said decoding means being applied to said comparing means.

9. Apparatus according to claim 8 wherein said means for sensing the rotation of said one tape reel comprises:

first energy transmitting and receiving means; and first shutter means operatively coupled to said one tape reel and interposed between said first energy transmitting and receiving means, said first shutter means having a single aperture therein, said first energy transmitting and receiving means producing a single first pulse for each rotation of said one tape reel.

10. Apparatus according to claim 9 wherein said means for sensing the rotation of said tape drive mechanism comprises:

second energy transmitting and receiving means; and second shutter means operatively coupled to said tape drive mechanism and interposed between said second energy transmitting and receiving means, said second shutter means having a plurality of apertures therein, said second energy transmitting and receiving means producing a plurality of second pulses for each rotation of said tape drive mechanism.

11. Apparatus according to claim 10 wherein said counting means counts the number of second pulses which occur between consecutive first pulses, such count being indicative of the number of revolutions of said one tape reel from said beginning of said tape.

12. Apparatus according to claim 8 further comprising:

second decoding means coupled to the output of said counting means and having a pre-programed count stored therein indicative of the number of second signals occurring between consecutive first signals at the beginning of said tape, said second decoding means being operative, upon the generation by said counting means of a count equal to said pre-programed count stored therein, to generate a signal indicative of the beginning of said tape.

13. Apparatus according to claim 12 further comprising:

third decoding means coupled to the output of said counting means and having a pre-programed count stored therein indicative of the number of second signals occurring between consecutive first signals at the end of said tape, said third decoding means being operative, upon the generation by said counting means of a count equal to said pre-programed count stored therein, to generate an inhibiting signal; and means responsive to said first signals and said inhibiting signal for generating a signal indicative of the end of said tape upon the occurrence of two consecutive first signals without an intervening inhibiting signal.

14. Apparatus according to claim 8 further comprising:

second decoding means coupled to the output of said counting means and having a pre-programed count stored therein indicative of the number of second signals occurring between consecutive first signals at the end of said tape, said second decoding means being operative, upon the generation by said counting means of a count equal to said pre-programed count stored therein, to generate an inhibiting signal; and means responsive to said first signals and said inhibiting signal for generating a signal indicative of the end of said tape upon the occurrence of two consecutive first signals without an intervening inhibiting signal.

15. Apparatus for use with a standard tape player, of the type including a tape drive mechanism for transporting magnetic tape from a supply reel to a take-up reel, for determining the position of said tape comprising:

means responsive to the rotation of one of said tape reels for generating a first signal indicative of the rate of rotation thereof;

means responsive to the rotation of said tape drive mechanism for generating a second signal indicative of the rate of rotation thereof; and means responsive to said first and second signals for generating an output signal which varies as the ratio of said first signal to said second signal, said output signal being indicative of the position of said tape relative to said supply and take-up reels.

16. Apparatus according to claim 15 wherein said means responsive to the rotation of said one tape reel produces at least one first signal for each rotation of said one tape reel, wherein said means responsive to the rotation of said tape drive mechanism produces at least one second signal for each rotation of said tape drive mechanism, and wherein said output signal generating means comprises:

counting means having a count input and a reset input, said first signal being applied to said reset input of said counting means and said second signal being applied to said count input of said counting means, the output of said counting means being indicative of the amount of rotation of said tape drive mechanism for a given rotation of said one tape reel; and decoding means responsive to the output of said counting means for generating said output signal indicative of the position of said tape relative to said supply and take-up reels.

17. Apparatus according to claim 16 wherein said first signal consists of a single pulse for each rotation of said one tape reel, wherein said second signal consists of a plurality of pulses for each rotation of said tape drive mechanism, and wherein the output of said counting means is indicative of the number of second pulses occurring between consecutive first pulses.

18. Apparatus according to claim 17 wherein said decoding means comprises:

pre-programed memory means responsive to the count output of said counting means for generating an output signal indicative of the number of revolutions of said one tape reel from the beginning of said tape.

19. Apparatus according to claim 17 further comprising:

second decoding means responsive to the output of said counting means and having a pre-programed count stored therein indicative of the number of second pulses occurring between consecutive first pulses at the beginning of said tape, said second decoding means being operative, upon the generation by said counting means of a count equal to said pre-programed count stored therein, to generate a signal indicative of the beginning of said tape.

20. Apparatus according to claim 19 further comprising:

third decoding means responsive to the output of said counting means and have a pre-programed count stored therein indicative of the number of second pulses occurring between consecutive first pulses at the end of said tape, said third decoding means being operative, upon the generation by said counting means of a count equal to said pre-programed count stored therein, to generate an inhibiting signal; and means responsive to said first pulses and said inhibiting signal for generating a signal indicative of the end of said tape upon the occurrence of two consecutive first pulses without an intervening inhibiting signal.

21. Apparatus according to claim 17 further comprising:

second decoding means responsive to the output of said counting means and have a pre-programed count stored therein indicative of the number of second pulses occurring between consecutive first pulses at the end of said tape, said second decoding means being operative, upon the generation by said counting means of a count equal to said pre-programed count stored therein, to generate an inhibiting signal; and means responsive to said first pulses and said inhibiting signal for generating a signal indicative of the end of said tape upon the occurrence of two consecutive first pulses without an intervening inhibiting signal.

* * * * *